US012174959B2

(12) United States Patent
Ji et al.

(10) Patent No.: US 12,174,959 B2
(45) Date of Patent: Dec. 24, 2024

(54) METHOD AND SYSTEM FOR AUTOMATICALLY GENERATING MALWARE SIGNATURE

(71) Applicant: Palo Alto Networks, Inc., Santa Clara, CA (US)

(72) Inventors: Yang Ji, San Jose, CA (US); Tyler Pals Halfpop, Carmel, IN (US); Zihang Xiao, Los Gatos, CA (US); Wenjun Hu, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 235 days.

(21) Appl. No.: 17/666,103

(22) Filed: Feb. 7, 2022

(65) Prior Publication Data

US 2023/0306114 A1   Sep. 28, 2023

(51) Int. Cl.
*G06F 21/00* (2013.01)
*G06F 21/56* (2013.01)
*G06F 21/57* (2013.01)

(52) U.S. Cl.
CPC .......... *G06F 21/564* (2013.01); *G06F 21/577* (2013.01); *G06F 2221/033* (2013.01)

(58) Field of Classification Search
CPC ....... G06F 21/564; G06F 21/577; H04L 29/06
See application file for complete search history.

(56) References Cited

U.S. PATENT DOCUMENTS

| 11,675,904 | B1* | 6/2023 | Powers | G06N 3/08 726/24 |
| 2014/0165203 | A1* | 6/2014 | Friedrichs | G06F 21/552 726/24 |
| 2023/0122784 | A1* | 4/2023 | Khan | H04L 63/101 726/3 |

* cited by examiner

*Primary Examiner* — Jeffrey C Pwu
*Assistant Examiner* — Thong P Truong
(74) *Attorney, Agent, or Firm* — Van Pelt, Yi & James LLP

(57) ABSTRACT

Automatic generation of a malware signature is disclosed. Code of a sample including packages and function names is parsed. Standard type packages and vendor type packages are filtered from the code of the sample to obtain main type packages. A signature using a fuzzy hash for the sample is generated based on the main type packages. A determination of whether the sample is malware is performed using the signature and a similarity score threshold.

17 Claims, 15 Drawing Sheets

Section Headers:

| [Nr] | Name | Type | Address | Offset |
|---|---|---|---|---|
| | Size | EntSize | Flags | Link | Info | Align |
| [0] | | NULL | 0000000000000000 | 00000000 |
| | 0000000000000000 | 0000000000000000 | | 0 | 0 | 0 |
| [1] | .text | PROGBITS | 0000000000401000 | 00001000 |
| | 000000000029e9b3 | 0000000000000000 | AX | 0 | 0 | 16 |
| [2] | .plt | PROGBITS | 00000000069f9c0 | 0029f9c0 |
| | 0000000000000270 | 0000000000000010 | AX | 0 | 0 | 16 |
| [3] | .rodata | PROGBITS | 00000000006a0000 | 002a0000 |
| | 0000000000115fc6 | 0000000000000000 | A | 0 | 0 | 32 |
| [4] | .rela | RELA | 00000000007b5fc8 | 003b5fc8 |
| | 0000000000000018 | 0000000000000018 | A | 11 | 0 | 8 |
| [5] | .rela.plt | RELA | 00000000007b5fe0 | 003b5fe0 |
| | 0000000000000390 | 0000000000000018 | A | 11 | 2 | 8 |
| [6] | .gnu.version_r | VERNEED | 00000000007b6380 | 003b6380 |
| | 0000000000000050 | 0000000000000000 | A | 10 | 2 | 8 |
| [7] | .gnu.version | VERSYM | 00000000007b63e0 | 003b63e0 |
| | 0000000000000056 | 0000000000000002 | A | 11 | 0 | 2 |
| [8] | .hash | HASH | 00000000007b6440 | 003b6440 |
| | 00000000000000d0 | 0000000000000004 | A | 11 | 0 | 8 |
| [9] | .shstrtab | STRTAB | 0000000000000000 | 003b6520 |
| | 0000000000000228 | 0000000000000000 | | 0 | 0 | 1 |
| [10] | .dynstr | STRTAB | 00000000007b6760 | 003b6760 |
| | 000000000000024f | 0000000000000000 | A | 0 | 0 | 1 |
| [11] | .dynsym | DYNSYM | 00000000007b69c0 | 003b69c0 |
| | 0000000000000408 | 0000000000000018 | A | 10 | 1 | 8 |
| [12] | .typelink | PROGBITS | 00000000007b6de0 | 003b6de0 |
| | 0000000000002068 | 0000000000000000 | A | 0 | 0 | 32 |
| [13] | .itablink | PROGBITS | 00000000007b8e48 | 003b8e48 |
| | 0000000000000a68 | 0000000000000000 | A | 0 | 0 | 8 |
| [14] | .gosymtab | PROGBITS | 00000000007b98b0 | 003b98b0 |
| | 0000000000000000 | 0000000000000000 | A | 0 | 0 | 1 |
| [15] | .gopclntab | PROGBITS | 00000000007b98c0 | 003b98c0 |
| | 00000000001ac3f9 | 0000000000000000 | A | 0 | 0 | 32 |
| [16] | .go.buildinfo | PROGBITS | 0000000000966000 | 00566000 |
| | 0000000000000020 | 0000000000000000 | WA | 0 | 0 | 16 |
| [17] | .dynamic | DYNAMIC | 0000000000966020 | 00566020 |
| | 0000000000000130 | 0000000000000010 | WA | 10 | 0 | 8 |
| [18] | .got.plt | PROGBITS | 0000000000966160 | 00566160 |
| | 0000000000000148 | 0000000000000008 | WA | 0 | 0 | 8 |

FIG. 5

```json
{
  "sha256": "cfc1530bb675031890d211fc9505cbd8e7e42a98bd94e3964601071c09036b9b",
  "build_id": "udvPb_MrL1B06Q_vPpMi/9JUMJHL1s0HpoPj2ipnS/C_bSGeoN1F34XASsoNZB/YhovvrBMSkamgicngrpQ",
  "mainPackages": [
    {
      "pkgname": "main",
      "functions": [
        {
          "funcname": "main::glob..::func1",
          "offset": "0x823b3b0",
          "end": "0x823b3e0"
        },
        {
          "funcname": "main::make_rmcsh_options::func1",
          "offset": "0x823b3e0",
          "end": "0x823b410"
        },
        {
          "funcname": "main::::make_rmcsh_options",
          "offset": "0x8234a30",
          "end": "0x8235460"
        },
        {
          "funcname": "main::::get_last_url",
          "offset": "0x8235460",
          "end": "0x82357d0"
        },
        {
          "funcname": "main::::GET_request_noredict",
          "offset": "0x82357d0",
          "end": "0x8235fa0"
        },
        {
          "funcname": "main::::GET_request",
          "offset": "0x8235fa0",
          "end": "0x82369c0"
        },
        {
          "funcname": "main::::removeDuplicates",
          "offset": "0x82369c0",
          "end": "0x8236bb0"
        },
        {
          "funcname": "main::::stats_update",
          "offset": "0x8236bb0",
          "end": "0x8236ec0"
        },
        {
          "funcname": "main::::GetMD5Hash",
          "offset": "0x8236ec0",
          "end": "0x8236fc0"
        },
```

FIG. 5 (Cont.)

| Threshold ssdeep 45 | Coverage on available* FN | FP# |
|---|---|---|
| ELF 1/1/2020 - 4/7/2021 | All: 64.2% (36/56); Customer: 100% (2/2) | 2 (mixed in clustering) |
| PE 1/1/2021 - 4/7/2021 Golang samples | All: 78% (434/551); Customer: 71% (5/7) | 1 (mixed in clustering) |

| Threshold ssdeep 60 | Coverage on available* FN | FP# |
|---|---|---|
| ELF 1/1/2020 - 4/7/2021 | All: 57.1% (32/56); Customer: 100% (2/2) | 0 |
| PE 1/1/2021 - 4/7/2021 Golang samples | All: 75.7% (417/551); Customer: 71% (5/7) | 0 |

FIG. 6

Example 1: Sysrv-botnet

Sysrv-botnet

Coinminer written in Golang

Found same family across Linux and Windows

Using GoHash signature to find cross-platform family

The main pkg name signatures of PE and ELF are 100% matched

The full main func name signatures also have high similarity in fuzzy hash

Diff of exploit functions:

"hello/exp::::CVE_2019_3396",
"hello/exp::::CVE_2017_12149",
"hello/exp::::CVE_2018_1000861",
"hello/exp::::CVE_2018_7600",
"hello/exp::::CVE_2019_10758",
"hello/exp::::CVE_2020_16846",
"hello/exp::::CVE_2020_14882",
"hello/exp::::CVE_2019_0193",

FIG. 7

Example 2: HabitsRAT
- Blogged by Intezer 4/21/2021
- Attacks against Microsoft Exchange servers; attacks Linux servers by enabling remote control;
- Main function names
  - "main:::RunSignedCommand"
  - "main:::RunCommand"
  - "main:::GetOrGenerateKey"
  - "main:::GenerateKey"
  - "main:::GetKeyStore"
  - "main:::SetKey"
  - "main:::GetKey"
  - "main:::IsRootAsString"
  - "main:::GetRootKeyStore"
  - "main:::InstallPersistence"
  - ........
- GoHash similarity score 72 between Linux and Windows samples with full main function name
  - Windows and Linux versions share most main functions, but Windows has more OS specific functions.

FIG. 8

Example 3: ElectroRAT

- Found to be blogged by Intezer (1/5/2021)
- It is a crypto wallet stealer that includes: domain registrations, websites, trojanized applications, fake social media accounts and a new undetected RAT that is named ElectroRAT.
- Multiple operating systems: Windows, Linux and MacOS.
- Main function examples
  - Shared
    - "main::bindataFileInfo::Name"
    - "main::bindataFileInfo::ModTime"
    - "main::keepAlive::func1"
    - "main::socketConnect::func1"
  - Windows
    - "main::::static_windowsChrome_windowsExe"
    - "main::::static_windowsPort_forwardExe"
  - Linux
    - "main::::static_linuxKeylogger_linux"
    - "main::::static_linuxChrome_linux"
    - ...
- GoHash clusters them in the same group

FIG. 9

METHOD AND SYSTEM FOR AUTOMATICALLY GENERATING MALWARE SIGNATURE

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

FIG. 5 illustrates an example of a list of section headers and a list of functions for a section associated with a malware sample.

FIG. 6 illustrates an example of results from signature generation.

FIG. 7 is an example of a malware sample.

FIG. 8 is another example of a malware sample.

FIG. 9 is yet another example of a malware sample.

DETAILED DESCRIPTION

Figure 1:
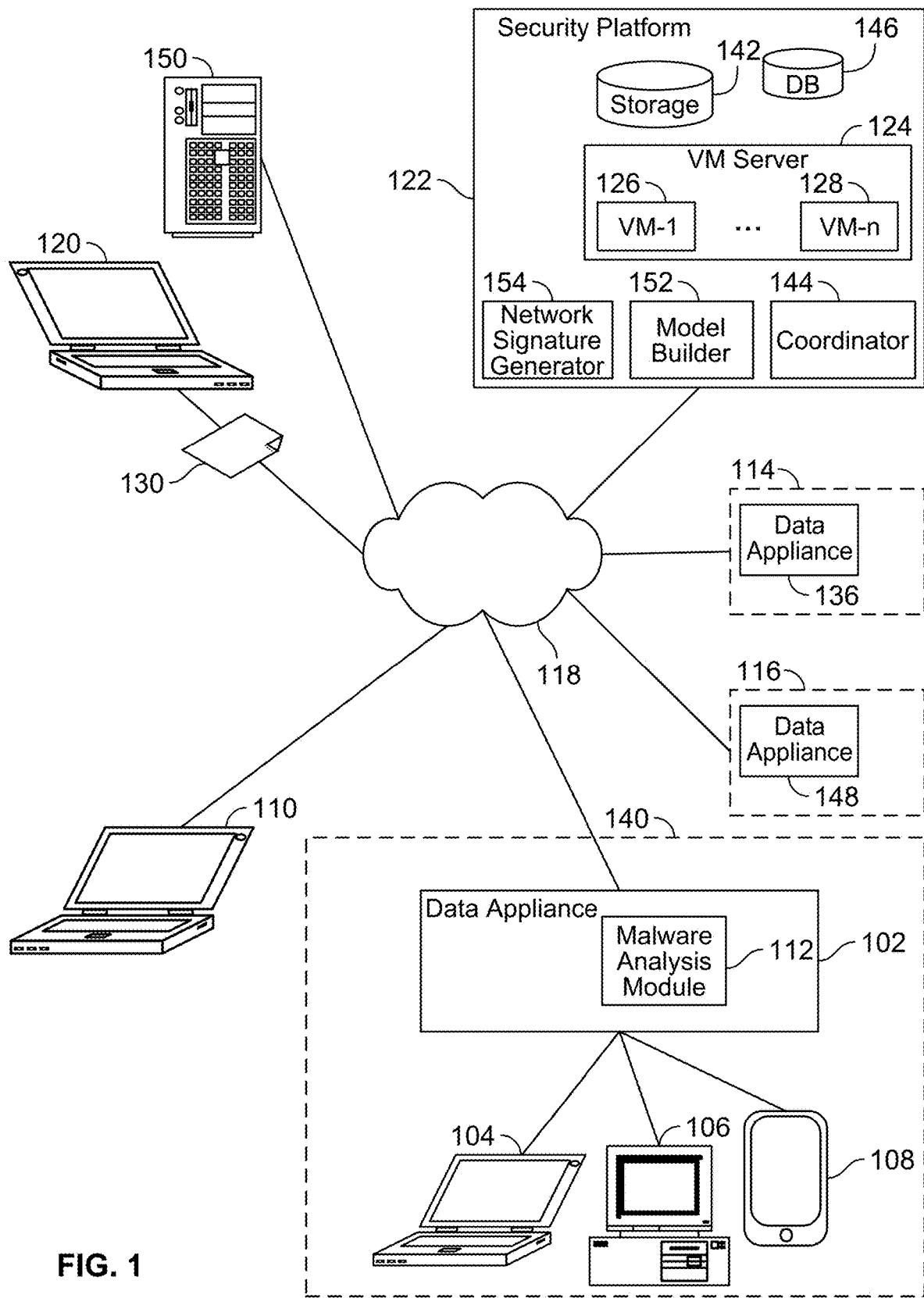
FIG. 1 illustrates an example of an environment in which malicious applications are detected and prevented from causing harm.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Go (AKA Golang) is a statically typed, compiled programming language and has become more and more popular across multiple platforms (e.g., Windows, MacOS, Linux, etc.). Some firewalls have difficulty identifying malware written in Golang because the malware written in Golang has a large amount of statically linked benign libraries. By including a large amount of statically linked benign libraries, malware written in Golang can be more difficult to accurately identify because usage of the benign libraries can cause confusion to detection techniques, such as, for example, detection techniques that are based on machine learning and usage of fuzzy hashes. For example, when a malicious sample has a large amount of benign libraries compiled in, detection techniques can be confused because the malicious sample can be substantially similar to a benign sample due to the large amount of benign libraries compiled in.

In some embodiments, a system/method/computer program product for automatically generating a malware signature includes parsing code of a sample including packages and function names; filtering standard type packages and vendor type packages from the code of the sample to obtain main type packages; generating a signature using a fuzzy hash for the sample based on the main type packages; and determining whether the sample is malware using the signature and a similarity score threshold.

In some embodiments, the parsing of the code of the sample includes parsing a table of the sample to extract the packages and the function names.

In some embodiments, the filtering of the standard type packages and the vendor type packages from the code of the sample includes classifying the packages of the sample into main type, standard type, and vendor type; and filtering the standard type packages and the vendor type packages from the packages to obtain the main type packages.

In some embodiments, the generating of the signature using the fuzzy hash for the sample based on the main type packages includes obtaining functions associated with the main type packages; concatenating the functions associated with the main type packages to obtain a concatenated string; and performing a fuzzy hash on the concatenated string to obtain the signature.

In some embodiments, the fuzzy hash includes ssdeep.

In some embodiments, the determining whether the sample is malware using the signature and the similarity score threshold includes comparing the signature with a signature associated with a known malware to obtain a similarity score.

In some embodiments, the determining whether the sample is malware using the signature and the similarity score threshold further includes determining whether the similarity score is equal to or exceeds the similarity score threshold; and in the event that the similarity score is equal to or exceeds the similarity score threshold, determining that the sample is malware.

In some embodiments, the determining whether the sample is malware using the signature and the similarity score threshold further includes determining whether the similarity score is equal to or exceeds the similarity score threshold; and in the event that the similarity score fails to equal or exceed the similarity score threshold, determining that the sample is benign.

FIG. 1 illustrates an example of an environment in which malicious applications ("malware") are detected and prevented from causing harm. As will be described in more detail below, malware classifications (e.g., as made by security platform 122) can be variously shared and/or refined among various entities included in the environment shown in FIG. 1. And, using techniques described herein, devices, such as endpoint client devices 104-110 can be protected from such malware.

The term "application" is used throughout the Specification to collectively refer to programs, bundles of programs, manifests, packages, etc., irrespective of form/platform. An "application" (also referred to herein as a "sample") can be a standalone file (e.g., a calculator application having the filename "calculator.apk" or "calculator.exe") and can also be an independent component of another application (e.g., a mobile advertisement SDK or library embedded within the calculator app).

"Malware" as used herein refers to an application that engages in behaviors, whether clandestinely or not (and whether illegal or not), of which a user does not approve/would not approve if fully informed. Examples of malware include Trojans, viruses, rootkits, spyware, hacking tools, keyloggers, etc. One example of malware is a desktop application that collects and reports to a remote server the end user's location (but does not provide the user with location-based services, such as a mapping service). Another example of malware is a malicious Android Application Package.apk (APK) file that appears to an end user to be a free game, but stealthily sends SMS premium messages (e.g., costing $10 each), running up the end user's phone bill. Another example of malware is an Apple IOS flashlight application that stealthily collects the user's contacts and sends those contacts to a spammer. Other forms of malware can also be detected/thwarted using the techniques described herein (e.g., ransomware). Further, while n-grams/feature vectors/output accumulation variables are described herein as being generated for malicious applications, techniques described herein can also be used in various embodiments to generate profiles for other kinds of applications (e.g., adware profiles, goodware profiles, etc.). Techniques described herein can be used in conjunction with a variety of platforms (e.g., desktops, mobile devices, gaming platforms, embedded systems, etc.) and/or a variety of types of applications (e.g., Android apk files, iOS applications, Windows PE files, Adobe Acrobat PDF files, etc.). In the example environment shown in FIG. 1, client devices 104-108 are a laptop computer, a desktop computer, and a tablet (respectively) present in an enterprise network 140. Client device 110 is a laptop computer present outside of enterprise network 140.

Techniques described herein can be used in conjunction with a variety of platforms (e.g., desktops, mobile devices, gaming platforms, embedded systems, etc.) and/or a variety of types of applications (e.g., Android.apk files, iOS applications, Windows PE files, Adobe Acrobat PDF files, etc.). In the example environment shown in FIG. 1, client devices 104-108 are a laptop computer, a desktop computer, and a tablet (respectively) present in an enterprise network 140. Client device 110 is a laptop computer present outside of enterprise network 140.

Data appliance 102 is configured to enforce policies regarding communications between client devices, such as client devices 104 and 106, and nodes outside of enterprise network 140 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers. In some embodiments, data appliance 102 is also configured to enforce policies with respect to traffic that stays within enterprise network 140.

As will be described later, a model builder 152 trains a machine learning model using labeled network traffic from a security service to evaluate network events associated with a set of known malware samples and a set of known benign samples. A network signature generator 154 generates network profiles for malware samples; selects network signature candidates based on the network profiles; automatically evaluates the network signature candidates to automatically generate a new set of network signatures; and distributes the new set of network signatures to a data appliance 102 to enforce the new set of network signatures to detect malware.

Figure 2A:
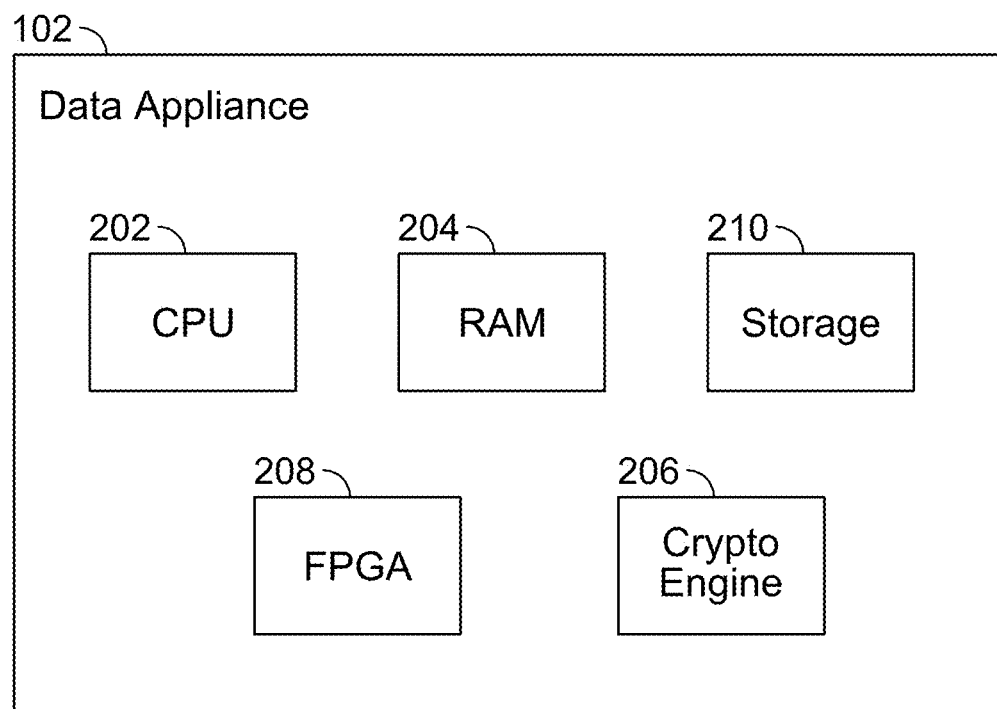
FIG. 2A illustrates an embodiment of a data appliance.

An embodiment of a data appliance is shown in FIG. 2A. The example shown is a representation of physical components that are included in data appliance 102, in various embodiments. Specifically, data appliance 102 includes a high performance multi-core Central Processing Unit (CPU) 202 and Random Access Memory (RAM) 204. Data appliance 102 also includes a storage 210 (such as one or more hard disks or solid state storage units). In various embodiments, data appliance 102 stores (whether in RAM 204, storage 210, and/or other appropriate locations) information used in monitoring enterprise network 140 and implementing disclosed techniques. Examples of such information include application identifiers, content identifiers, user identifiers, requested URLs, IP address mappings, policy and other configuration information, signatures, hostname/URL categorization information, malware profiles, and machine learning models. Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. The functionality provided by data appliance 102 can also be integrated into or executed as software on a general purpose computer, a computer server, a gateway, and/or a network/routing device. In some embodiments, at least some services described as being provided by data appliance 102 are instead (or in addition) provided to a client device (e.g., client device 104 or client device 110) by software executing on the client device.

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing-Social Networking; Web Browsing-News; SSH; and so on.

Figure 2B:
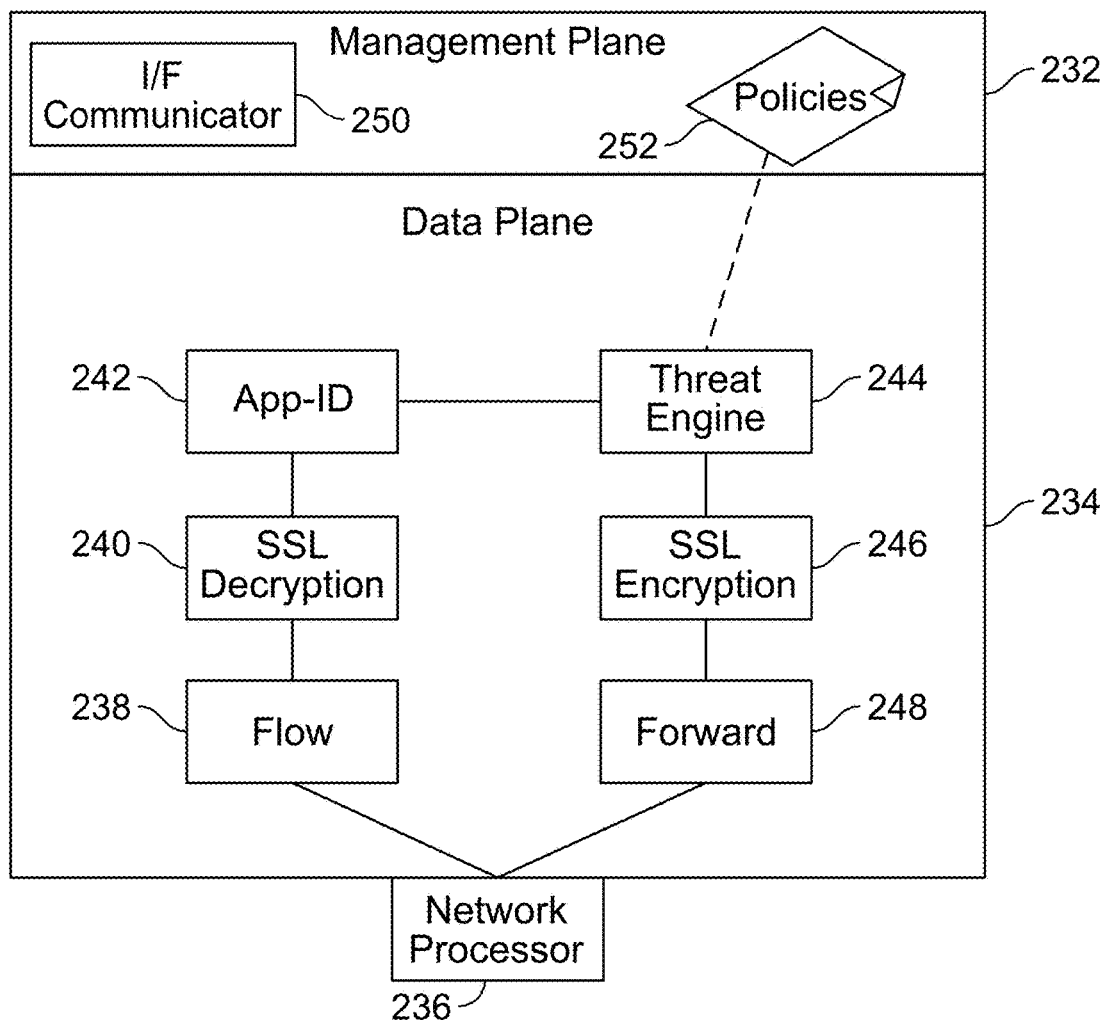
FIG. 2B is a functional diagram of logical components of an embodiment of a data appliance.

FIG. 2B is a functional diagram of logical components of an embodiment of a data appliance. The example shown is a representation of logical components that can be included in data appliance 102 in various embodiments. Unless otherwise specified, various logical components of data appliance 102 are generally implementable in a variety of ways, including as a set of one or more scripts (e.g., written in Java, python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 140. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 242 is configured to determine what type of traffic a session involves. As one example, application identification engine 242 can recognize a GET request in received data and conclude that the session requires an HTTP decoder. In some cases, e.g., a web browsing session, the identified application can change, and such changes will be noted by data appliance 102. For example, a user may initially browse to a corporate Wiki (classified based on the URL visited as "Web Browsing-Productivity") and then subsequently browse to a social networking site (classified based on the URL visited as "Web Browsing-Social Networking"). Different types of protocols have corresponding decoders.

Based on the determination made by application identification engine 242, the packets are sent, by threat engine 244, to an appropriate decoder configured to assemble packets (which may be received out of order) into the correct order, perform tokenization, and extract out information. Threat engine 244 also performs signature matching to determine what should happen to the packet. As needed, SSL encryption engine 246 can re-encrypt decrypted data. Packets are forwarded using a forward module 248 for transmission (e.g., to a destination).

As also shown in FIG. 2B, policies 252 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 250 is provided for management communications (e.g., via (REST) APIs, messages, or network protocol communications or other communication mechanisms).

III. Security Platform

Returning to FIG. 1, suppose a malicious individual (using system 120) has created malware 130. The malicious individual hopes that a client device, such as client device 104, will execute a copy of malware 130, compromising the client device, and, e.g., causing the client device to become a bot in a botnet. The compromised client device can then be instructed to perform tasks (e.g., cryptocurrency mining, or participating in denial of service attacks) and to report information to an external entity, such as command and control (C&C) server 150, as well as to receive instructions from C&C server 150, as applicable.

Suppose data appliance 102 has intercepted an email sent (e.g., by system 120) to a user, "Alice," who operates client device 104. A copy of malware 130 has been attached by system 120 to the message. As an alternate, but similar scenario, data appliance 102 could intercept an attempted download by client device 104 of malware 130 (e.g., from a website). In either scenario, data appliance 102 determines whether a signature for the file (e.g., the email attachment or website download of malware 130) is present on data appliance 102. A signature, if present, can indicate that a file is known to be safe (e.g., is whitelisted), and can also indicate that the file is known to be malicious (e.g., is blacklisted).

In various embodiments, data appliance 102 is configured to work in cooperation with security platform 122. As one example, security platform 122 can provide to data appliance 102 a set of signatures of known-malicious files (e.g., as part of a subscription). If a signature for malware 130 is included in the set (e.g., an MD5 hash of malware 130), data appliance 102 can prevent the transmission of malware 130 to client device 104 accordingly (e.g., by detecting that an MD5 hash of the email attachment sent to client device 104 matches the MD5 hash of malware 130). Security platform 122 can also provide to data appliance 102 a list of known malicious domains and/or IP addresses, allowing data appliance 102 to block traffic between enterprise network 140 and C&C server 150 (e.g., where C&C server 150 is known to be malicious). The list of malicious domains (and/or IP addresses) can also help data appliance 102 determine when one of its nodes has been compromised. For example, if client device 104 attempts to contact C&C server 150, such attempt is a strong indicator that client 104 has been compromised by malware (and remedial actions should be taken accordingly, such as quarantining client device 104 from communicating with other nodes within enterprise network 140). As will be described in more detail below, security platform 122 can also provide other types of information to data appliance 102 (e.g., as part of a subscription) such as a set of machine learning models usable by data appliance 102 to perform inline analysis of files.

A variety of actions can be taken by data appliance 102 if no signature for an attachment is found, in various embodiments. As a first example, data appliance 102 can fail-safe, by blocking transmission of any attachments not whitelisted as benign (e.g., not matching signatures of known good files). A drawback of this approach is that there may be many legitimate attachments unnecessarily blocked as potential malware when they are in fact benign. As a second example, data appliance 102 can fail-danger, by allowing transmission of any attachments not blacklisted as malicious (e.g., not matching signatures of known bad files). A drawback of this approach is that newly created malware (previously unseen by platform 122) will not be prevented from causing harm.

As a third example, data appliance 102 can be configured to provide the file (e.g., malware 130) to security platform 122 for static/dynamic analysis, to determine whether it is malicious and/or to otherwise classify it. A variety of actions can be taken by data appliance 102 while analysis by security platform 122 of the attachment (for which a signature is not already present) is performed. As a first example, data appliance 102 can prevent the email (and attachment) from being delivered to Alice until a response is received from security platform 122. Assuming platform 122 takes approximately 15 minutes to thoroughly analyze a sample, this means that the incoming message to Alice will be delayed by 15 minutes. Since, in this example, the attachment is malicious, such a delay will not impact Alice negatively. In an alternate example, suppose someone has sent Alice a time sensitive message with a benign attachment for which a signature is also not present. Delaying delivery of the message to Alice by 15 minutes will likely be viewed (e.g., by Alice) as unacceptable. As will be described in more detail below, an alternate approach is to perform at least some real-time analysis on the attachment on data appliance 102 (e.g., while awaiting a verdict from platform 122). If data appliance 102 can independently determine whether the attachment is malicious or benign, it can take an initial action (e.g., block or allow delivery to Alice), and can adjust/take additional actions once a verdict is received from security platform 122, as applicable.

Security platform 122 stores copies of received samples in storage 142 and analysis is commenced (or scheduled, as applicable). One example of storage 142 is an Apache Hadoop Cluster (HDFS). Results of analysis (and additional information pertaining to the applications) are stored in database 146. In the event an application is determined to be malicious, data appliances can be configured to automatically block the file download based on the analysis result. Further, a signature can be generated for the malware and distributed (e.g., to data appliances such as data appliances 102, 136, and 148) to automatically block future file transfer requests to download the file determined to be malicious.

In various embodiments, security platform 122 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 122 can be implemented across a scalable infrastructure comprising multiple such servers, solid state drives, and/or other applicable high-performance hardware. Security platform 122 can comprise several distributed components, including components provided by one or more third parties. For example, portions or all of security platform 122 can be implemented using the Amazon Elastic Compute Cloud (EC2) and/or Amazon Simple Storage Service (S3). Further, as with data appliance 102, whenever security platform 122 is referred to as performing a task, such as storing data or processing data, it is to be understood that a sub-component or multiple sub-components of security platform 122 (whether individually or in cooperation with third party components) may cooperate to perform that task. As one example, security platform 122 can optionally perform static/dynamic analysis in cooperation with one or more virtual machine (VM) servers, such as VM server 124.

An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 122, but may also be provided by a third party. As one example, the virtual machine server can rely on EC2, with the remainder portions of security platform 122 provided by dedicated hardware owned by and under the control of the operator of security platform 122. VM server 124 is configured to provide one or more virtual machines 126-128 for emulating client devices. The virtual machines can execute a variety of operating systems and/or versions thereof. Observed behaviors resulting from executing applications in the virtual machines are logged and analyzed (e.g., for indications that the application is malicious). In some embodiments, log analysis is performed by the VM server (e.g., VM server 124). In other embodiments, analysis is performed at least in part by other components of security platform 122, such as a coordinator 144.

In various embodiments, security platform 122 makes available results of its analysis of samples via a list of signatures (and/or other identifiers) to data appliance 102 as part of a subscription. For example, security platform 122 can periodically send a content package that identifies malware apps (e.g., daily, hourly, or some other interval, and/or based on an event configured by one or more policies). An example content package includes a listing of identified malware apps, with information such as a package name, a hash value for uniquely identifying the app, and a malware name (and/or malware family name) for each identified malware app. The subscription can cover the analysis of just those files intercepted by data appliance 102 and sent to security platform 122 by data appliance 102, and can also cover signatures of all malware known to security platform 122 (or subsets thereof, such as just mobile malware but not other forms of malware (e.g., PDF malware)). As will be described in more detail below, platform 122 can also make available other types of information, such as machine learning models that can help data appliance 102 detect malware (e.g., through techniques other than hash-based signature matching).

In various embodiments, security platform 122 is configured to provide security services to a variety of entities in addition to (or, as applicable, instead of) an operator of data appliance 102. For example, other enterprises, having their own respective enterprise networks 114 and 116, and their own respective data appliances 136 and 148, can contract with the operator of security platform 122. Other types of entities can also make use of the services of security platform 122. For example, an Internet Service Provider (ISP) providing Internet service to client device 110 can contract with security platform 122 to analyze applications which client device 110 attempts to download. As another example, the owner of client device 110 can install software on client device 110 that communicates with security platform 122 (e.g., to receive content packages from security platform 122, use the received content packages to check attachments in accordance with techniques described herein, and transmit applications to security platform 122 for analysis).

IV. Analyzing Samples Using Static/Dynamic Analysis

Figure 3:
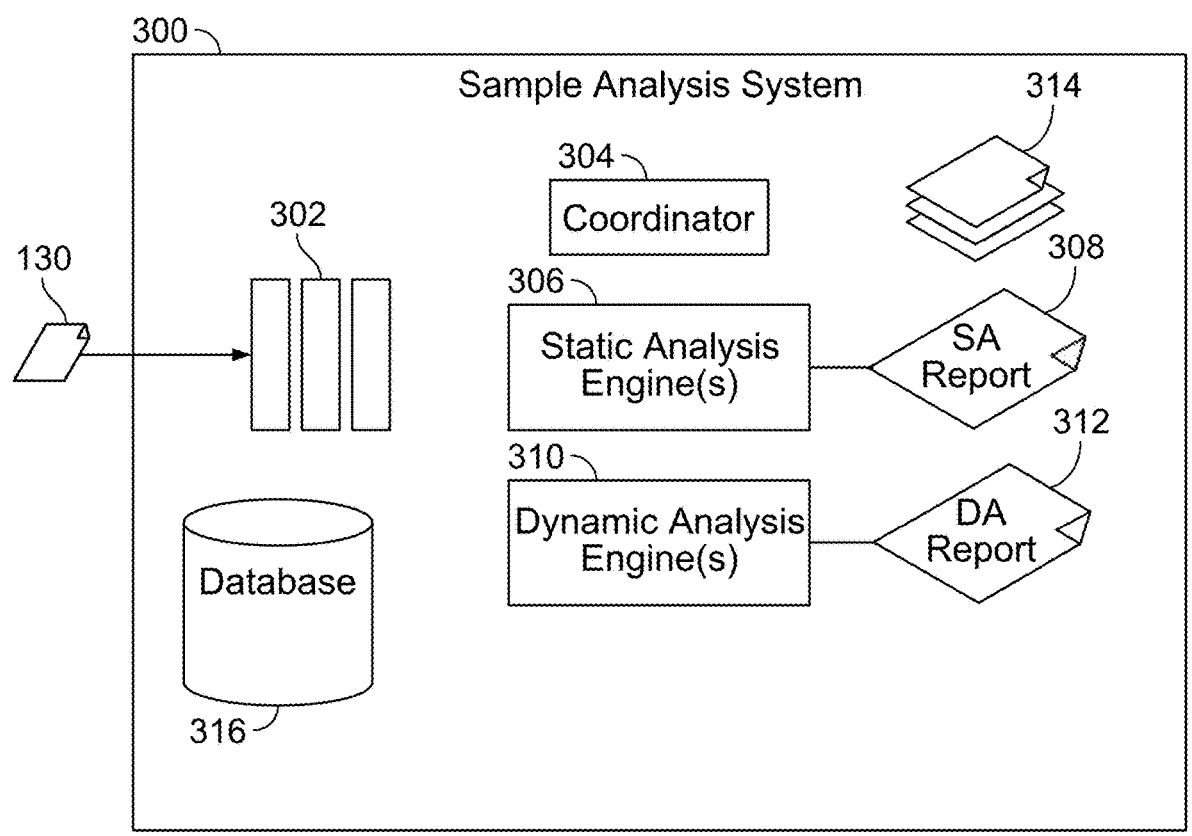
FIG. 3 illustrates an example of logical components that can be included in a system for analyzing samples.

FIG. 3 illustrates an example of logical components that can be included in a system for analyzing samples. Analysis system 300 can be implemented using a single device. For example, the functionality of analysis system 300 can be implemented in a malware analysis module 112 incorporated into data appliance 102. Analysis system 300 can also be implemented, collectively, across multiple distinct devices. For example, the functionality of analysis system 300 can be provided by security platform 122.

In various embodiments, analysis system 300 makes use of lists, databases, or other collections of known safe content and/or known bad content (collectively shown in FIG. 3 as collection 314). Collection 314 can be obtained in a variety of ways, including via a subscription service (e.g., provided by a third party) and/or as a result of other processing (e.g., performed by data appliance 102 and/or security platform 122). Examples of information included in collection 314 are: URLs, domain names, and/or IP addresses of known malicious servers; URLs, domain names, and/or IP addresses of known safe servers; URLs, domain names, and/or IP addresses of known command and control (C&C) domains; signatures, hashes, and/or other identifiers of known malicious applications; signatures, hashes, and/or other identifiers of known safe applications; signatures, hashes, and/or other identifiers of known malicious files (e.g., Android exploit files); signatures, hashes, and/or other identifiers of known safe libraries; and signatures, hashes, and/or other identifiers of known malicious libraries.

A. Ingestion

In various embodiments, when a new sample is received for analysis (e.g., an existing signature associated with the sample is not present in analysis system 300), it is added to queue 302. As shown in FIG. 3, application 130 is received by system 300 and added to queue 302.

B. Static Analysis

Coordinator 304 monitors queue 302, and as resources (e.g., a static analysis worker) become available, coordinator 304 fetches a sample from queue 302 for processing (e.g., fetches a copy of malware 130). In particular, coordinator 304 first provides the sample to static analysis engine 306 for static analysis. In some embodiments, one or more static analysis engines are included within analysis system 300, where analysis system 300 is a single device. In other embodiments, static analysis is performed by a separate static analysis server that includes a plurality of workers (i.e., a plurality of instances of static analysis engine 306).

The static analysis engine obtains general information about the sample, and includes it (along with heuristic and other information, as applicable) in a static analysis report 308. The report can be created by the static analysis engine, or by coordinator 304 (or by another appropriate component) which can be configured to receive the information from static analysis engine 306. In some embodiments, the collected information is stored in a database record for the sample (e.g., in database 316), instead of or in addition to a separate static analysis report 308 being created (i.e., portions of the database record form the report 308). In some embodiments, the static analysis engine also forms a verdict with respect to the application (e.g., "safe," "suspicious," or "malicious"). As one example, the verdict can be "malicious" if even one "malicious" static feature is present in the application (e.g., the application includes a hard link to a known malicious domain). As another example, points can be assigned to each of the features (e.g., based on severity if found; based on how reliable the feature is for predicting malice; etc.) and a verdict can be assigned by static analysis engine 306 (or coordinator 304, if applicable) based on the number of points associated with the static analysis results.

C. Dynamic Analysis

Once static analysis is completed, coordinator 304 locates an available dynamic analysis engine 310 to perform dynamic analysis on the application. As with static analysis engine 306, analysis system 300 can include one or more dynamic analysis engines directly. In other embodiments, dynamic analysis is performed by a separate dynamic analysis server that includes a plurality of workers (i.e., a plurality of instances of dynamic analysis engine 310).

Each dynamic analysis worker manages a virtual machine instance. In some embodiments, results of static analysis (e.g., performed by static analysis engine 306), whether in report form (308) and/or as stored in database 316, or otherwise stored, are provided as input to dynamic analysis engine 310. For example, the static report information can be used to help select/customize the virtual machine instance used by dynamic analysis engine 310 (e.g., Microsoft Windows 7 SP 2 vs. Microsoft Windows 10 Enterprise, or iOS 11.0 vs. iOS 12.0). Where multiple virtual machine instances are executed at the same time, a single dynamic analysis engine can manage all of the instances, or multiple dynamic analysis engines can be used (e.g., with each managing its own virtual machine instance), as applicable. As will be explained in more detail below, during the dynamic portion of the analysis, actions taken by the application (including network activity) are analyzed.

In various embodiments, static analysis of a sample is omitted or is performed by a separate entity, as applicable. As one example, traditional static and/or dynamic analysis may be performed on files by a first entity. Once it is determined (e.g., by the first entity) that a given file is malicious, the file can be provided to a second entity (e.g., the operator of security platform 122) specifically for additional analysis with respect to the malware's use of network activity (e.g., by a dynamic analysis engine 310).

The environment used by analysis system 300 is instrumented/hooked such that behaviors observed while the application is executing are logged as they occur (e.g., using a customized kernel that supports hooking and logcat). Network traffic associated with the emulator is also captured (e.g., using pcap). The log/network data can be stored as a temporary file on analysis system 300, and can also be stored more permanently (e.g., using HDFS or another appropriate storage technology or combinations of technology, such as MongoDB). The dynamic analysis engine (or another appropriate component) can compare the connections made by the sample to lists of domains, IP addresses, etc. (314) and determine whether the sample has communicated (or attempted to communicate) with malicious entities.

As with the static analysis engine, the dynamic analysis engine stores the results of its analysis in database 316 in the record associated with the application being tested (and/or includes the results in report 312 as applicable). In some embodiments, the dynamic analysis engine also forms a verdict with respect to the application (e.g., "safe," "suspicious," or "malicious"). As one example, the verdict can be "malicious" if even one "malicious" action is taken by the application (e.g., an attempt to contact a known malicious domain is made, or an attempt to exfiltrate sensitive information is observed). As another example, points can be assigned to actions taken (e.g., based on severity if found; based on how reliable the action is for predicting malice; etc.) and a verdict can be assigned by dynamic analysis engine 310 (or coordinator 304, if applicable) based on the number of points associated with the dynamic analysis results. In some embodiments, a final verdict associated with the sample is made based on a combination of report 308 and report 312 (e.g., by coordinator 304).

V. Inline Malware Detection

Returning to the environment of FIG. 1, millions of new malware samples may be generated each month (e.g., by nefarious individuals such as the operator of system 120, whether by making subtle changes to existing malware or by authoring new malware). Accordingly, there will exist many malware samples for which security platform 122 (at least initially) has no signature. Further, even where security platform 122 has generated signatures for newly created malware, resource constraints prevent data appliances, such as data appliance 102, from having/using a list of all known signatures (e.g., as stored on platform 122) at any given time.

Sometimes malware, such as malware 130, will successfully penetrate network 140. One reason for this is where data appliance 102 operates on a "first-time allow" principle. Suppose that when data appliance 102 does not have a signature for a sample (e.g., sample 130) and submits it to security platform 122 for analysis, it takes security platform 122 approximately five minutes to return a verdict (e.g., "benign," "malicious," "unknown," etc.). Instead of blocking communications between system 120 and client device 104 during that five minute time period, under a first-time allow principle, the communication is allowed. When a verdict is returned (e.g., five minutes later), data appliance 102 can use the verdict (e.g., "malicious") to block subsequent transmissions of malware 130 to network 140, can block communications between system 120 and network 140, etc. In various embodiments, if a second copy of sample 130 arrives at data appliance 102 during the period data appliance 102 is awaiting a verdict from security platform 122, the second copy (and any subsequent copies) of sample 130 will be held by system 120 pending a response from security platform 122.

Unfortunately, during the five minutes that data appliance 102 awaits a verdict from security platform 122, a user of client device 104 could have executed malware 130, potentially compromising client device 104 or other nodes in network 140. As mentioned above, in various embodiments, data appliance 102 includes a malware analysis module 112. One task that malware analysis module 112 can perform is inline malware detection. In particular, and as will be described in more detail below, as a file (such as sample 130) passes through data appliance 102, machine learning techniques can be applied to perform efficient analysis of the file on data appliance 102 (e.g., in parallel with other processing performed on the file by data appliance 102) and an initial maliciousness verdict can be determined by data appliance 102 (e.g., while awaiting a verdict from security platform 122).

Various difficulties can arise in implementing such analysis on a resource constrained appliance such as data appliance 102. One critical resource on appliance 102 is session memory. A session is a network transfer of information, including the files that appliance 102 is to analyze in accordance with techniques described herein. A single appliance might have millions of concurrent sessions, and the memory available to persist during a given session is extremely limited. A first difficulty in performing inline analysis on a data appliance such as data appliance 102 is that, due to such memory constraints, data appliance 102 will typically not be able to process an entire file at once, but instead receive a sequence of packets which it needs to process, packet by packet. A machine learning approach used by data appliance 102 will accordingly need to accommodate packet streams in various embodiments. A second difficulty is that in some cases, data appliance 102 will be unable to determine where an end of a given file being processed occurs (e.g., the end of sample 130 in a stream). A machine learning approach used by data appliance 102 will accordingly need to be able to make a verdict about a given file potentially midstream (e.g., halfway through receipt/processing of sample 130 or otherwise prior to the actual file end) in various embodiments.

A. Machine Learning Models

As will be described in more detail below, in various embodiments, security platform 122 provides a set of machine learning models to data appliance 102 for data appliance 102 to use in conjunction with inline malware detection. The models incorporate features (e.g., n-grams or other features) determined by security platform 122 as corresponding to malicious files. Two example types of such models include linear classification models and non-linear classification models. Examples of linear classification models that can be used by data appliance 102 include logistic regression and linear support vector machines. An example of a non-linear classification model that can be used by data appliance 102 includes a gradient boosting tree (e.g., eXtreme Gradient Boosting (XGBoost)). The non-linear model is more accurate (and is better able to detect obfuscated/disguised malware), but the linear model uses considerably fewer resources on appliance 102 (and is more suitable for efficiently analyzing JavaScript or similar files).

As will be described in more detail below, which type of classification model is used for a given file being analyzed can be based on a filetype associated with the file (and determined, e.g., by a magic number).

1. Additional Detail on the Threat Engine

In various embodiments, data appliance 102 includes a threat engine 244. The threat engine incorporates both protocol decoding and threat signature matching during a respective decoder stage and pattern match stage. Results of the two stages are merged by a detector stage.

When data appliance 102 receives a packet, data appliance 102 performs a session match to determine to which session the packet belongs (allowing data appliance 102 to support concurrent sessions). Each session has a session state which implicates a particular protocol decoder (e.g., a web browsing decoder, an FTP decoder, or an SMTP decoder). When a file is transmitted as part of a session, the applicable protocol decoder can make use of an appropriate file-specific decoder (e.g., a PE file decoder, a JavaScript decoder, or a PDF decoder).

Figure 4:
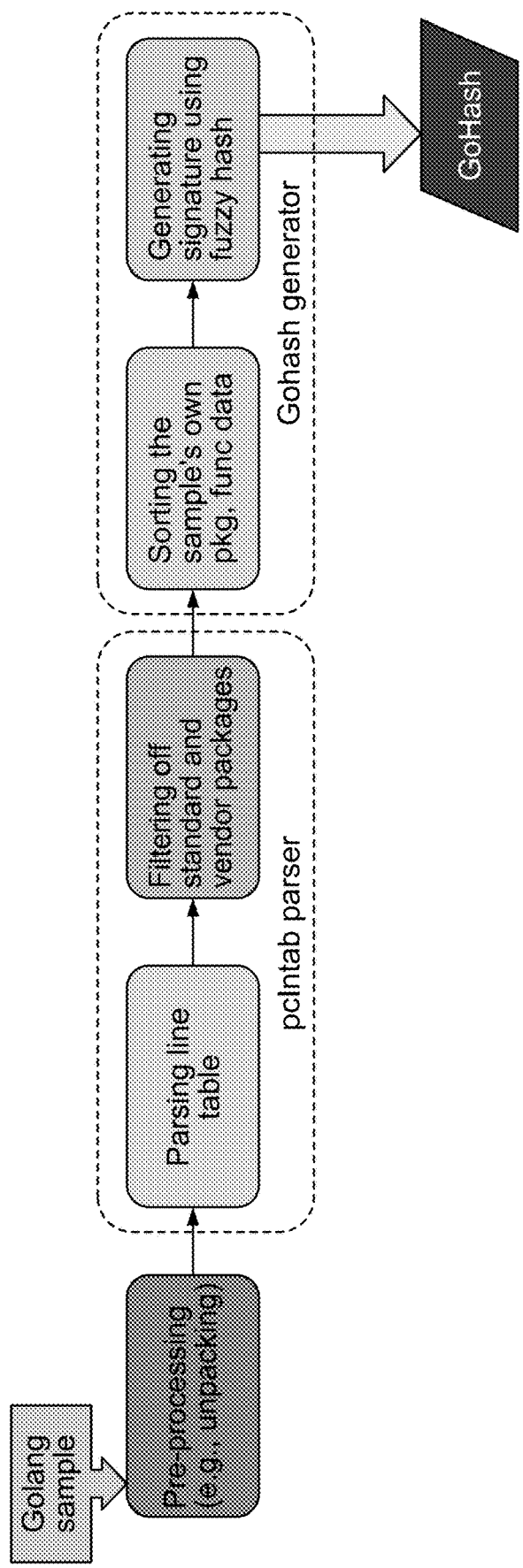
FIG. 4 illustrates an embodiment of a workflow for automatically generating a malware signature.

FIG. 4 illustrates an embodiment of a workflow for automatically generating a malware signature.

In the example of the workflow, a sample written in Golang is provided to a parser to generate compile information. In some embodiments, pre-processing is performed on the sample. For example, the sample is unpacked to obtain the binary if the sample was originally packed (e.g., encoded and/or encrypted), and after the sample is unpacked, a line table (pclntab) of the binary can be parsed to generate compile information. In some embodiments, the compile information includes package names, function names, and compile time/source paths. The compile time can relate to when the source code was compiled. The function names can be sorted, for example, into alphabetical order because compilers can reorder functions. For example, the functions of two samples can be in different order even though the two samples are derived from the identical source code. By sorting the function names, the resulting order of the function names can be more consistent. In some embodiments, the packages are sorted into "main" types, "standard" types, and "vendor" types. "Main" type packages typically refer to the sample's own code; "standard" type packages typically refer to Golang standard libraries; and "vendor" type packages typically refer to third party libraries. After the packages are sorted, the packages are filtered. In some embodiments, the "standard" types and the "vendor" types of packages are removed to obtain only the "main" types of packages. Typically, the standard type packages are common to many applications. Typically, the vendor type packages come from third party providers. In some embodiments the "main" types of packages are concatenated into a concatenated string. In some embodiments, a fuzzy hash is calculated using the concatenated string to obtain a signature. Unlike hash functions, fuzzy hash functions (e.g., ssdeep, and tlsh) hold a certain tolerance for changes, and can tell how different two files/strings are by comparing their output. The fuzzy hash can be compared to a fuzzy hash of a known malware sample of a set of known malware samples to obtain a similarity score. In some embodiments, the verdict is positive (malicious) in the event that the similarity score satisfies or exceeds a threshold. In some embodiments, the verdict is negative (benign) in the event that the similarity score fails to exceed the threshold.

FIG. 5 illustrates an example of a list of section headers and a list of functions for a section associated with a malware sample.

As shown in the image on the left of FIG. 5, a list of section headers is provided. In the example, the list of section headers includes section headers such as text, plt, rodata, rela, . . . , gopclntab, etc. The section header gopclntab can be the line table. As shown in the image on the right of FIG. 5, the line table includes at least the following package: a "main" package. The "main" package represents the portion of the software that the developer of the sample provided and includes at least the following function names: make_rmcsh_options, get_last_url, GET_request_noredict, GET_request, removeDuplicates, stats_update, and GetMD5Hash. Other packages can include standard functions and vendor functions.

FIG. 6 illustrates an example of results from signature generation. After the fuzzy hash is performed on the concatenated string to obtain a signature, the obtained signature can be deployed in a firewall or some other network security device. In this example from Jan. 1, 2020 to Apr. 7, 2021, when a signature generated by the fuzzy hash ssdeep function was compared with signatures of malware samples, the similarity score threshold was set to 45%, and the signatures of malware samples were executable and linkable (ELF) file format files (Linux), 64.2% (36 out of 56), previously identified false negative samples are correctly identified. The previously identified false negative results relate to samples that were false negatives when using conventional detection techniques. For example, there were 56 false negatives using a conventional detection technique; however, when using a signature generated by the present invention, 36 of the samples were correctly identified and removed from the "false negative" bucket, so the detection rate is increased by 64.2%. In the "mixed" results, two samples appear in both benign and malicious clusters, so the signature generated by the present invention fails to handle these two samples. In this example from Jan. 1, 2021 to Apr. 7, 2021, when a signature generated by the fuzzy hash ssdeep function was compared with signatures of malware samples, the similarity score threshold was set to 45%, and the signatures of malware samples were portable executable (PE) file format files (Windows) using Golang samples, 78% (434 out of 551), previously identified false negative samples are correctly identified. Also, in this example from Jan. 1, 2020 to Apr. 7, 2021, when a signature generated by the fuzzy hash ssdeep function was compared with signatures of malware samples, the similarity score threshold was set to 60%, and the signatures of malware samples were ELF file format files, 57.1% (32 out of 56), previously identified false negative samples are correctly identified. In this example from Jan. 1, 2021 to Apr. 7, 2021, when a signature generated by the fuzzy hash ssdeep function was compared with signatures of malware samples, the similarity score threshold was set to 60%, and the signatures of malware samples were PE file format files using Golang samples, 75.7% (417 out of 551), previously identified false negative samples are correctly identified. During training, the verdict derived based on the similarity score can be compared to the ground truth, and afterwards the results can be analyzed. To reduce false positives, the similarity score threshold could be set to 60%.

FIG. 7 is an example of a malware sample. In the example, the malware sample is spread from Sysrv-botnet. The malware sample is spread by installing a Monero cryptominer called Coinminer, written in Golang, and found across both Windows and Linux. The main package name signatures of the ELF malware version and the PE malware version can be 100% matched, and the function names associated with the main packages of the two malware versions are highly similar. In this example, after the standard type functions and the vendor type functions are filtered out, the remaining functions (the "main" type functions) include the following: CVE_2019_3396, CVE_2017_12149, CVE_2018_1000861, CVE_2018_7600, CVE_2019_10758, CVE_2020_16846, CVE_2020_14882, and CVE_2019_0193.

FIG. 8 is another example of a malware sample. In the example, the malware sample is called HabitsRAT and attacks Microsoft Exchange servers and Linux servers by enabling remote control. In this example, after the standard type functions and the vendor type functions are filtered out, the remaining functions (the "main" type functions) include the following: RunSignedCommand, RunCommand, GetOrGenerateKey, GenerateKey, GetKeyStore, SetKey, GetKey, IsRootAsString, GetRootKeyStore, and InstallPersistence. The GoHash similarity score between "Main" type functions (the "standard" type of functions and the "vendor" type of functions have been filtered out) of the Linux malware sample and the Windows malware sample is 72. Because the GoHash similarity score between the Linux and Windows malware samples is high, this indicates that the Windows and the Linux versions share most of the "Main" type functions; however, a further analysis indicates that the Windows malware sample has more operating system (OS) specific functions than the Linux malware sample.

FIG. 9 is yet another example of a malware sample. In this example, the malware sample is called ElectroRAT, creates fake companies to steal cryptocurrency from cryptowallets, is written in Golang, and is compiled to target multiple operating systems: Windows, Linux, and MacOS. ElectroRAT performs an extensive operation and is composed of a full-fledged marketing campaign, custom cryptocurrency-related applications, and a new Remote Access Tool (RAT) written from scratch. The campaign includes domain registrations, websites, trojanized applications, and fake social media accounts. In this example, after the standard type functions and the vendor type functions are filtered out, the remaining functions (the "main" type functions) include three types of functions: shared (both Windows and Linux), Windows only, and Linux only. The shared function names include: bindataFileinfo::Name, bindataFileinfo::ModTime, keepAlive::func1, and socketConnect::func1. The Windows only function names include: static_windowsChrome_windowsExe and static_windowsPort_forwardExe. The Linux only function names include: static_linuxKeylogger_linux and static_linuxChrome_linux.

Figure 10:
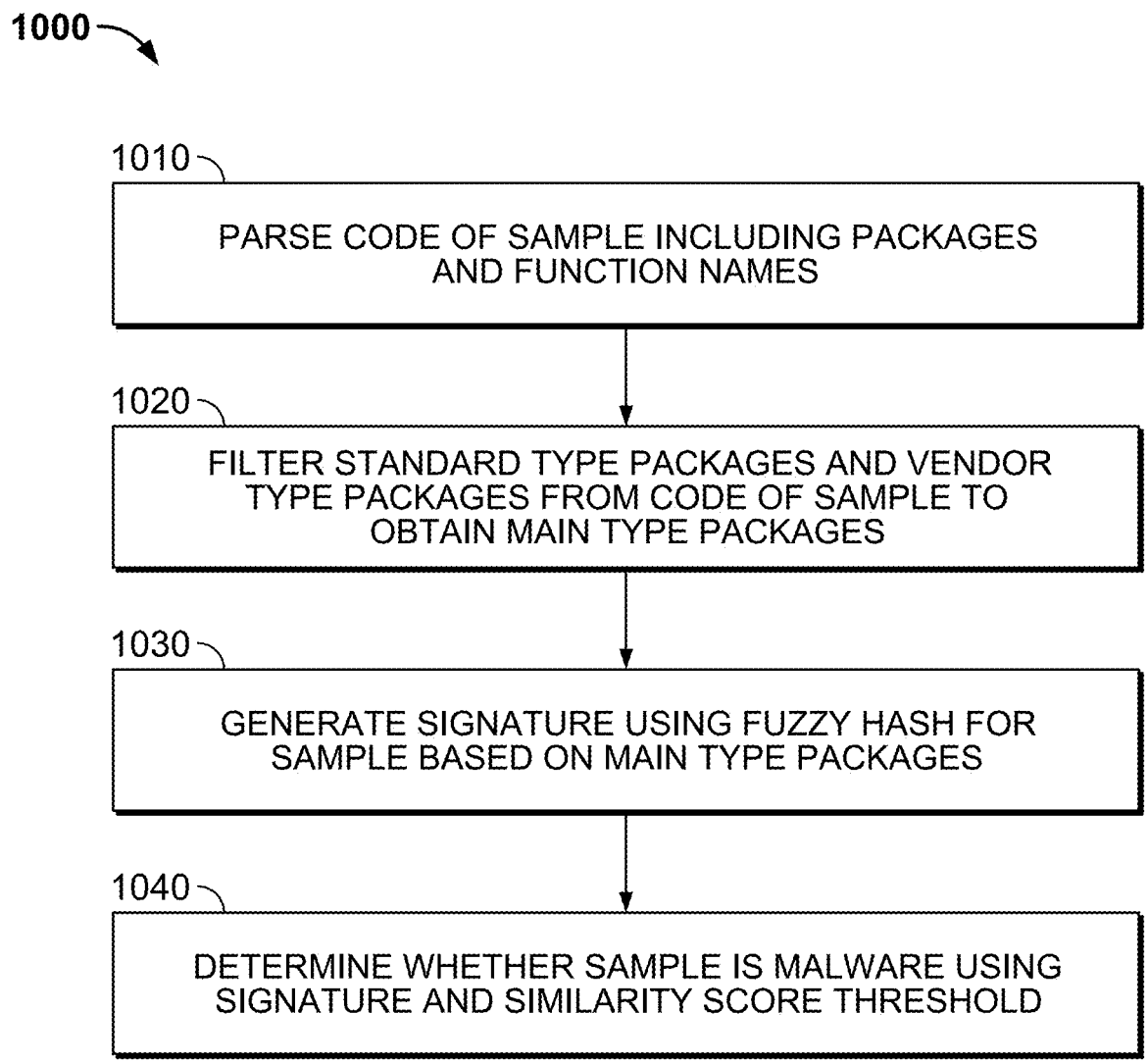
FIG. 10 is a flow diagram illustrating an embodiment of a process for automatically generating a malware signature.

FIG. 10 is a flow diagram illustrating an embodiment of a process for automatically generating a malware signature. In some embodiments, the process 1000 is implemented by the network signature generator 154 of FIG. 1 and comprises:

In 1010, the network signature generator parses code of a sample including packages and function names.

In some embodiments, the network signature generator parses code of the sample including packages, function names, and source paths.

In 1020, the network signature generator filters standard type packages and vendor type packages from the code of the sample to obtain main type packages.

Typically, the standard type packages are common to many applications. Typically, the vendor type packages come from third party providers.

In 1030, the network signature generator generates a signature using a fuzzy hash for the sample based on the main type packages.

In some embodiments, function names associated with the main type packages are obtained, and the function names are concatenated together to obtain a string. A fuzzy hash function can be applied to the string to obtain a signature. In some embodiments, the fuzzy hash is ssdeep. In some embodiments, a threshold for the fuzzy hash function is set to 45%, 60%, 75%, etc.

In 1040, the network signature generator determines whether the sample is malware using the signature and a similarity score threshold.

In some embodiments, the signature is compared with each signature of known malware, and in the event that the similarity score of any of the comparisons is equal to or exceeds the similarity score threshold, the network signature generator determines that the sample is malicious as a verdict.

Figure 11:
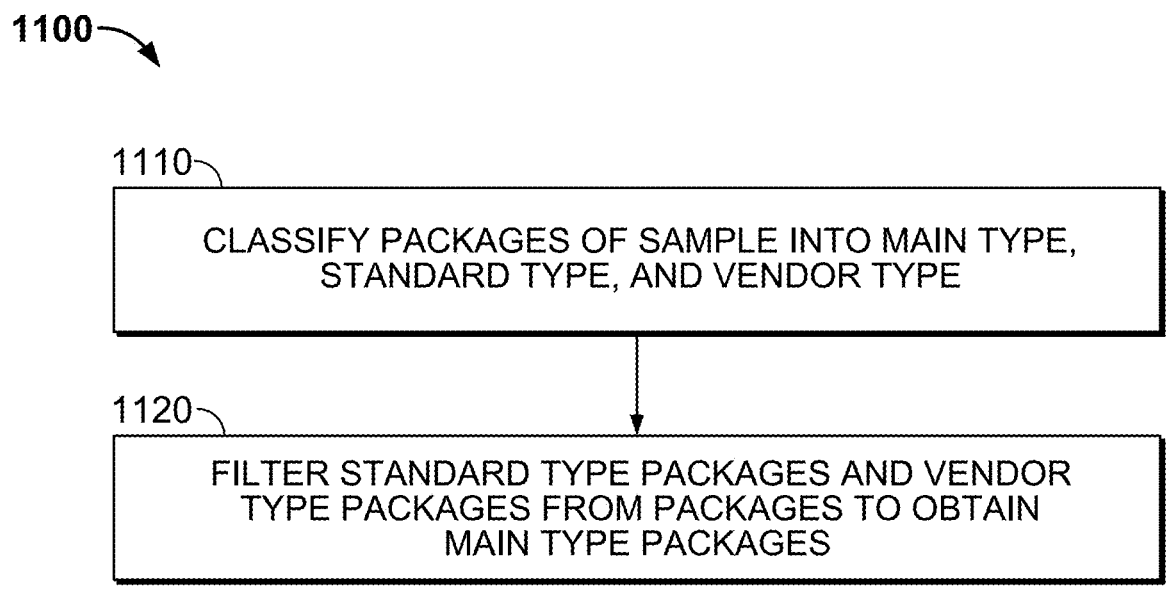
FIG. 11 is a flow diagram illustrating an embodiment of a process for filtering standard type packages and vendor type packages from code of a sample to obtain main type packages.

FIG. 11 is a flow diagram illustrating an embodiment of a process for filtering standard type packages and vendor type packages from code of a sample to obtain main type packages. In some embodiments, process 1100 is an implementation of operation 1020 of FIG. 10 and comprises:

In 1110, the network signature generator classifies packages of the sample into main type, standard type, and vendor type.

In some embodiments, the line table section head is located in the sample using a magic number. In some embodiments, a debug/gosym module in GoLang is used to parse the line table to obtain the packages and the function names. In some embodiments, the compile time\source paths are also obtained.

In some embodiments, based on the package names, the packages are classified into main type packages, standard type packages, and vendor type packages. The standard type packages are packages related to a standard library, and the vendor type packages are related to third party vendor libraries. The main type packages can be related to code provided by the author of the sample.

In 1120, the network signature generator filters the standard type packages and the vendor type packages from the packages to obtain the main type packages.

In some embodiments, before the packages are filtered, the packages are sorted based on alphabetical order.

Figure 12:
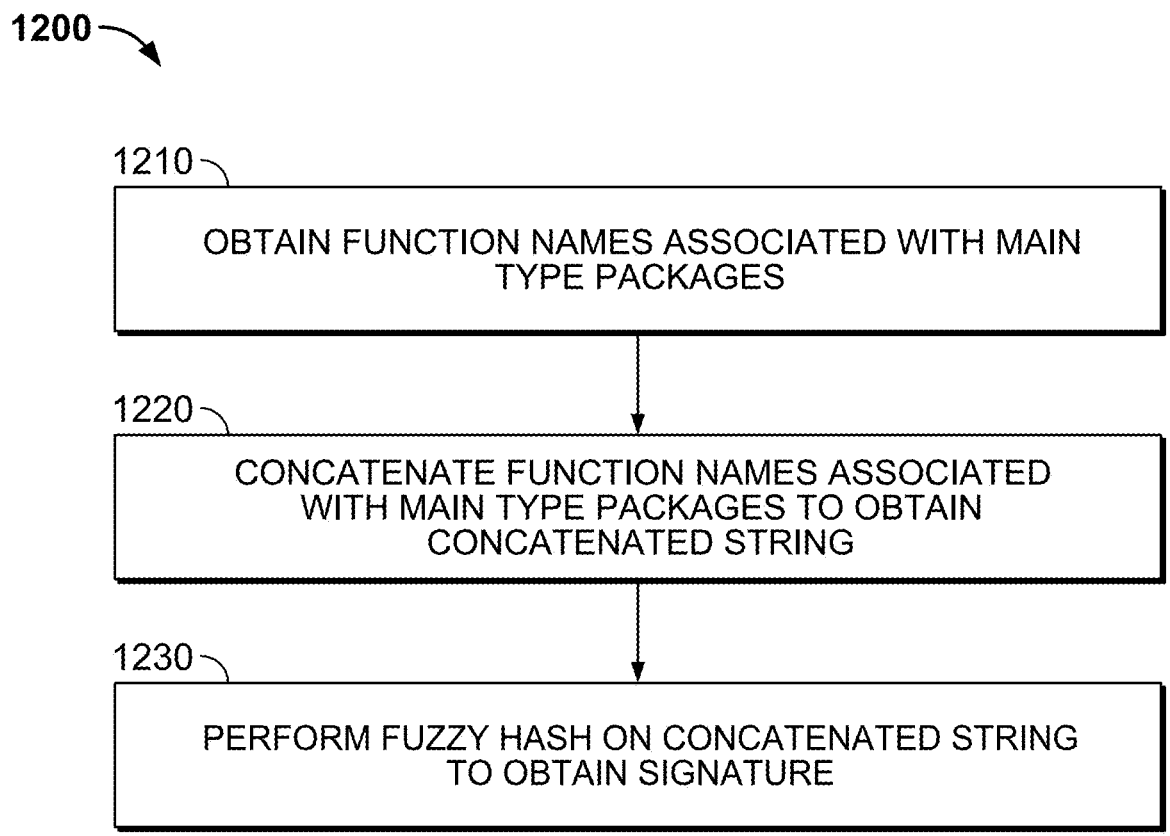
FIG. 12 is a flow diagram illustrating an embodiment of a process for generating a signature using a fuzzy hash for a sample based on main type packages.

FIG. 12 is a flow diagram illustrating an embodiment of a process for generating a signature using a fuzzy hash for a sample based on main type packages. In some embodiments, process 1200 is an implementation of operation 1030 of FIG. 10 and comprises:

In 1210, the network signature generator obtains function names associated with main type packages.

In 1220, the network signature generator concatenates the function names associated with the main type packages to obtain a concatenated string.

In 1230, the network signature generator performs a fuzzy hash on the concatenated string to obtain a signature.

In some embodiments, the fuzzy hash is ssdeep.

Figure 13:
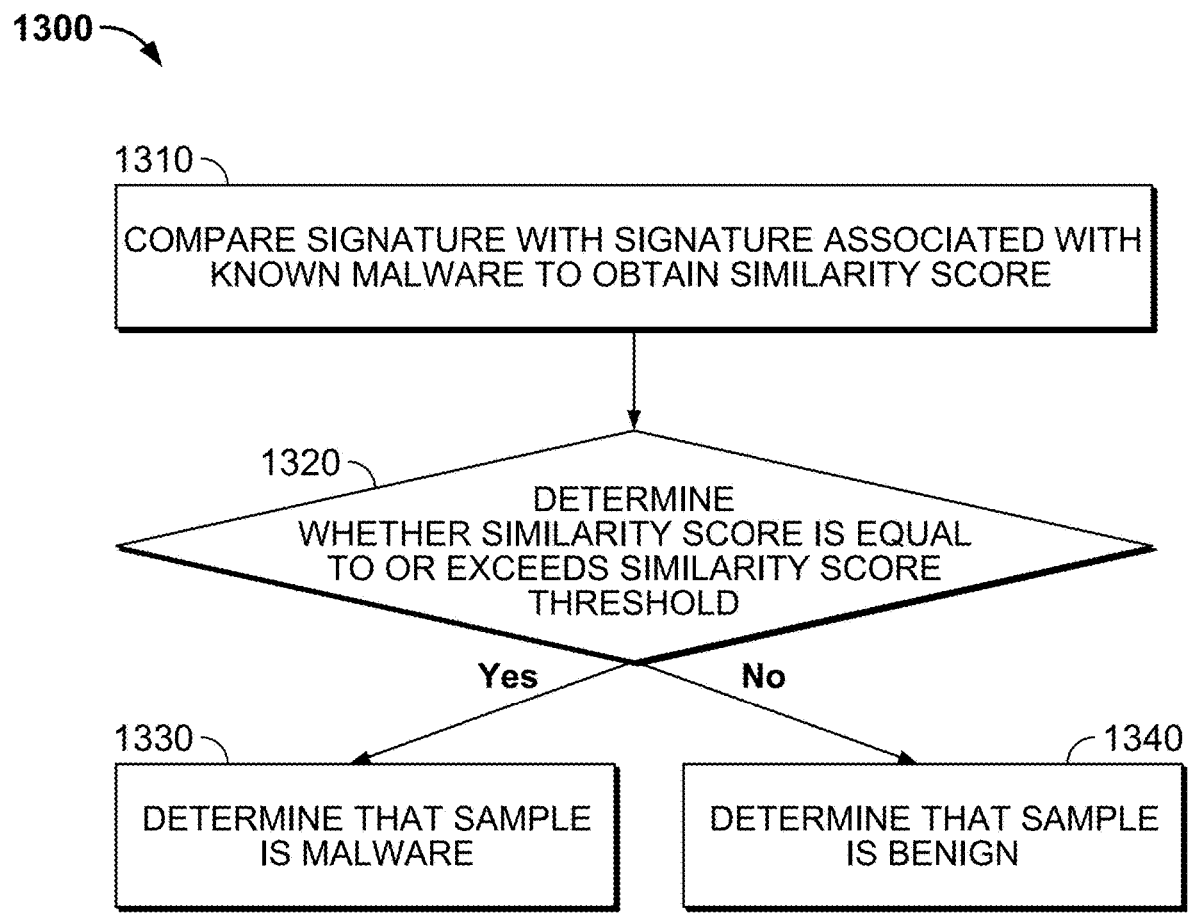
FIG. 13 is a flow diagram illustrating an embodiment of a process for determining whether a sample is malware using a signature and a similarity score threshold.

FIG. 13 is a flow diagram illustrating an embodiment of a process for determining whether a sample is malware using a signature and a similarity score threshold. In some embodiments, process 1300 is an implementation of operation 1040 of FIG. 10 and comprises:

In 1310, the network signature generator compares a signature with a signature associated with a known malware to obtain a similarity score.

In 1320, the network signature generator determines whether the similarity score is equal to or exceeds the similarity score threshold.

In some embodiments, the similarity score threshold is set to 35%, 45%, 60%, 70%, etc.

In 1330, in the event that the similarity score is equal to or exceeds the similarity score threshold, the network signature generator determines that the sample is malware.

In 1340, in the event that the similarity score fails to equal or exceed the similarity score threshold, the network signature generator determines that the sample is benign.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A system, comprising:
a processor configured to:
parse code of a sample including packages and function names;
filter standard type packages and vendor type packages from the code of the sample to obtain main type packages;
generate a signature using a fuzzy hash for the sample based on the main type packages, comprising to:
obtain function names associated with the main type packages;
concatenate the function names associated with the main type packages to obtain a concatenated string; and
perform the fuzzy hash on the concatenated string to obtain the signature; and
determine whether the sample is malware using the signature and a similarity score threshold; and
a memory coupled to the processor and configured to provide the processor with instructions.

2. The system of claim 1, wherein the parsing of the code of the sample comprises to:
parse a table of the sample to extract the packages and the function names.

3. The system of claim 1, wherein the filtering of the standard type packages and the vendor type packages from the code of the sample comprises to:
classify the packages of the sample into main type, standard type, and vendor type; and
filter the standard type packages and the vendor type packages from the packages to obtain the main type packages.

4. The system of claim 1, wherein the fuzzy hash includes ssdeep.

5. The system of claim 1, wherein the concatenating of the function names associated with the main type packages to obtain the concatenated string comprises to:
sort the function names in alphabetical order; and
concatenate the sorted function names to obtain the concatenated string.

6. The system of claim 1, wherein the determining whether the sample is malware using the signature and the similarity score threshold comprises to:
compare the signature with a signature associated with a known malware to obtain a similarity score.

7. The system of claim 6, wherein the determining whether the sample is malware using the signature and the similarity score threshold further comprises to:
determine whether the similarity score is equal to or exceeds the similarity score threshold; and
in the event that the similarity score is equal to or exceeds the similarity score threshold, determine that the sample is malware.

8. The system of claim 6, wherein the determining whether the sample is malware using the signature and the similarity score threshold further comprises to:
determine whether the similarity score is equal to or exceeds the similarity score threshold; and
in the event that the similarity score fails to equal or exceed the similarity score threshold, determine that the sample is benign.

9. A method, comprising:
parsing, using a processor, code of a sample including packages and function names;
filtering, using the processor, standard type packages and vendor type packages from the code of the sample to obtain main type packages;
generating, using the processor, a signature using a fuzzy hash for the sample based on the main type packages, comprising:
obtaining function names associated with the main type packages;
concatenating the function names associated with the main type packages to obtain a concatenated string; and
performing the fuzzy hash on the concatenated string to obtain the signature; and
determining, using the processor, whether the sample is malware using the signature and a similarity score threshold.

10. The method of claim 9, wherein the parsing of the code of the sample comprises:
parsing a table of the sample to extract the packages and the function names.

11. The method of claim 9, wherein the filtering of the standard type packages and the vendor type packages from the code of the sample comprises:
classifying the packages of the sample into main type, standard type, and vendor type; and
filtering the standard type packages and the vendor type packages from the packages to obtain the main type packages.

12. The method of claim 9, wherein the fuzzy hash includes ssdeep.

13. The method of claim 9, wherein the concatenating of the function names associated with the main type packages to obtain the concatenated string comprises:
sorting the function names in alphabetical order; and
concatenating the sorted function names to obtain the concatenated string.

14. The method of claim 9, wherein the determining whether the sample is malware using the signature and the similarity score threshold comprises:
comparing the signature with a signature associated with a known malware to obtain a similarity score.

15. The method of claim 14, wherein the determining whether the sample is malware using the signature and the similarity score threshold further comprises:
determining whether the similarity score is equal to or exceeds the similarity score threshold; and
in the event that the similarity score is equal to or exceeds the similarity score threshold, determining that the sample is malware.

16. The method of claim 14, wherein the determining whether the sample is malware using the signature and the similarity score threshold further comprises:
determining whether the similarity score is equal to or exceeds the similarity score threshold; and
in the event that the similarity score fails to equal or exceed the similarity score threshold, determining that the sample is benign.

17. A computer program product embodied in a non-transitory computer readable medium and comprising computer instructions for:
parsing code of a sample including packages and function names;
filtering standard type packages and vendor type packages from the code of the sample to obtain main type packages;

generating a signature using a fuzzy hash for the sample based on the main type, comprising:
  obtaining function names associated with the main type packages;
  concatenating the function names associated with the main type packages to obtain a concatenated string; and
  performing the fuzzy hash on the concatenated string to obtain the signature; and
determining whether the sample is malware using the signature and a similarity score threshold.

* * * * *